US006539728B2

(12) United States Patent
Korin

(10) Patent No.: US 6,539,728 B2
(45) Date of Patent: Apr. 1, 2003

(54) HYBRID HEAT PUMP

(76) Inventor: Amos Korin, 16 Mountainview Dr., Weston, CT (US) 06883

( * ) Notice: Subject to any disclaimer, the term of this patent is extended or adjusted under 35 U.S.C. 154(b) by 0 days.

(21) Appl. No.: 10/011,832

(22) Filed: Dec. 4, 2001

(65) Prior Publication Data

US 2002/0078696 A1 Jun. 27, 2002

Related U.S. Application Data

(60) Provisional application No. 60/251,207, filed on Dec. 4, 2000, and provisional application No. 60/257,031, filed on Dec. 21, 2000.

(51) Int. Cl.$^7$ .............................. F25D 21/00; F25B 29/00
(52) U.S. Cl. ............................................. 62/80; 62/325
(58) Field of Search ................ 62/80, 92, 93, 62/94, 238.7, 271, 324.1, 325; 95/47, 48; 165/104.12, 114

(56) References Cited

U.S. PATENT DOCUMENTS

| | | | |
|---|---|---|---|
| 2,223,586 A | 12/1940 | Thomas | 183/2 |
| 3,661,724 A | 5/1972 | Strickler | 204/1 T |
| 3,735,558 A | 5/1973 | Skarstrom et al. | 55/16 |
| 3,735,559 A | 5/1973 | Salemme | 55/16 |
| 4,040,804 A | 8/1977 | Harrison | 55/158 |
| 4,080,743 A | 3/1978 | Manos | 34/9 |
| 4,467,621 A | 8/1984 | O'Brien | 62/324.1 |
| 4,770,550 A | 9/1988 | Rhodes | 62/271 |
| 4,941,324 A | 7/1990 | Peterson et al. | 62/94 |
| 5,002,590 A | 3/1991 | Friesen et al. | 55/16 |
| 5,040,375 A | 8/1991 | Von Dobeln | 62/94 |
| 5,118,327 A | 6/1992 | Nelson et al. | 55/16 |
| 5,226,932 A * | 7/1993 | Prasad | 55/16 |
| 5,227,027 A | 7/1993 | Topper | 203/10 |
| 5,236,474 A | 8/1993 | Schofield | 95/47 |
| 5,300,197 A | 4/1994 | Mitani et al. | 202/177 |
| 5,325,676 A | 7/1994 | Meckler | 62/93 |
| 5,490,397 A | 2/1996 | Kitamura et al. | 62/474 |
| 5,517,828 A | 5/1996 | Calton et al. | 62/271 |
| 5,525,143 A | 6/1996 | Morgan et al. | 95/52 |
| 5,528,905 A | 6/1996 | Scarlatti | 62/3.4 |
| 5,551,245 A | 9/1996 | Calton et al. | 62/90 |
| 5,605,564 A | 2/1997 | Collins | 95/52 |
| 5,620,500 A | 4/1997 | Fukui et al. | 95/52 |
| 5,632,805 A | 5/1997 | Woodward | 96/4 |
| 5,641,337 A | 6/1997 | Arrowsmith et al. | 95/39 |
| 5,681,433 A | 10/1997 | Friesen et al. | 203/39 |
| 5,816,065 A | 10/1998 | Maeda | 62/271 |
| 5,843,209 A | 12/1998 | Ray et al. | 95/52 |
| 5,873,260 A | 2/1999 | Linhardt et al. | 62/497 |
| 5,946,931 A | 9/1999 | Lomax et al. | 62/304 |
| 5,964,923 A | 10/1999 | Lokhandwala | 95/50 |
| 6,004,383 A | 12/1999 | Kuhnelt | 96/8 |
| 6,027,546 A | 2/2000 | Kusters et al. | 95/52 |
| 6,070,339 A | 6/2000 | Cunkelman | 34/79 |
| 6,083,297 A | 7/2000 | Valus et al. | 95/44 |
| 6,090,312 A * | 7/2000 | Ziaka et al. | 252/373 |
| 6,128,916 A | 10/2000 | Callahan et al. | 62/475 |
| 6,276,167 B1 | 8/2001 | McCaulley | 62/619 |

* cited by examiner

Primary Examiner—Denise L. Esquivel
Assistant Examiner—Melvin Jones
(74) Attorney, Agent, or Firm—Ohlandt, Greeley, Ruggiero & Perle, LLP

(57) ABSTRACT

There is provided a hybrid heat pump system. The system includes (i) a membrane permeator having a permselective membrane capable of selectively removing vapor from a vapor-containing gas to yield a dry gas, (ii) a heat pump having (a) an internal side for exchanging thermal energy with a process fluid, (b) an external side for exchanging thermal energy with an external environment, and (c) a thermodynamic mechanism for pumping thermal energy between the internal side and the external side in either direction, (iii) means for conveying the vapor-containing gas into the membrane permeator, and (iv) means for routing the dry gas to either of the internal side or the external side.

26 Claims, 6 Drawing Sheets

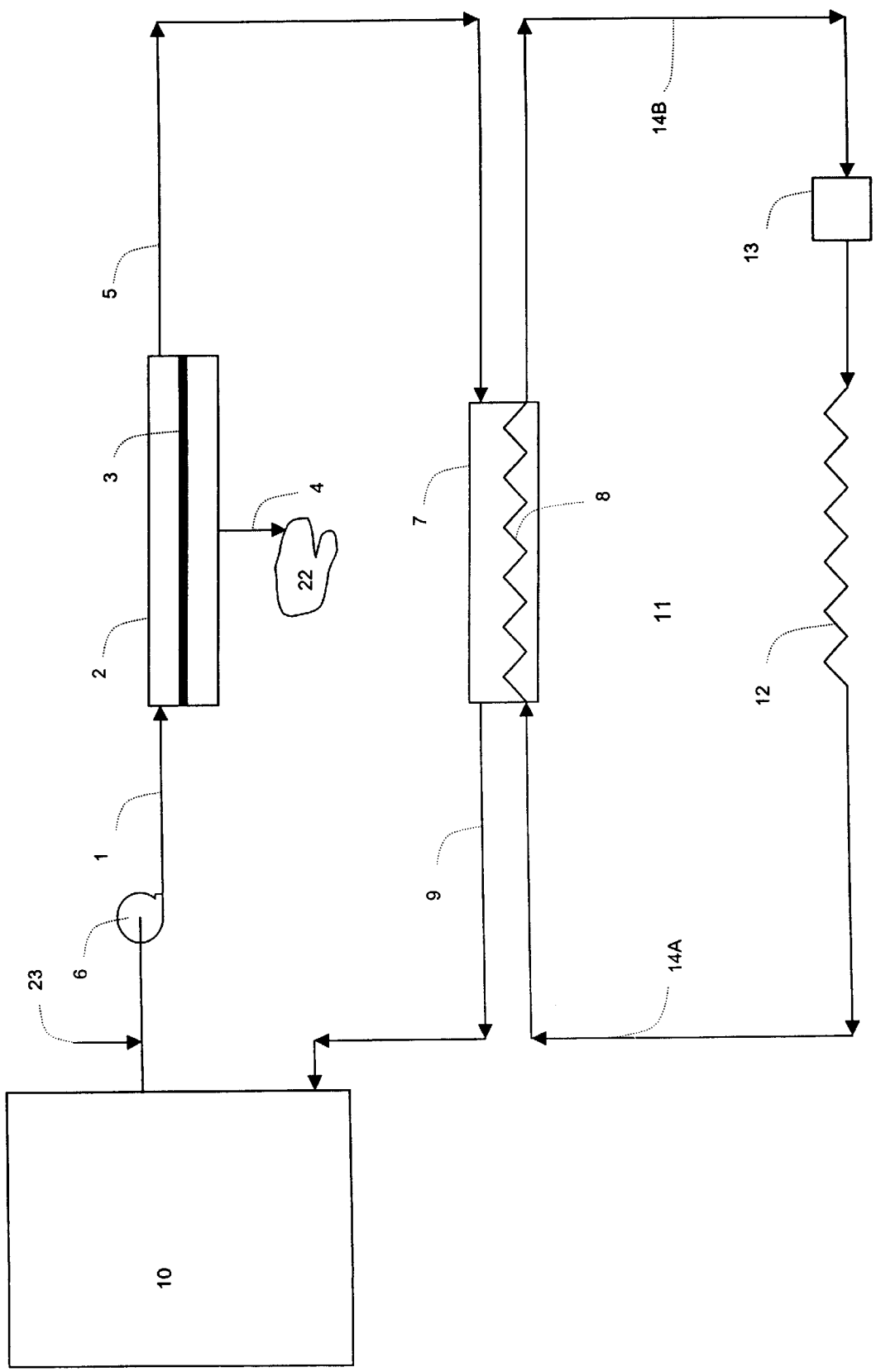

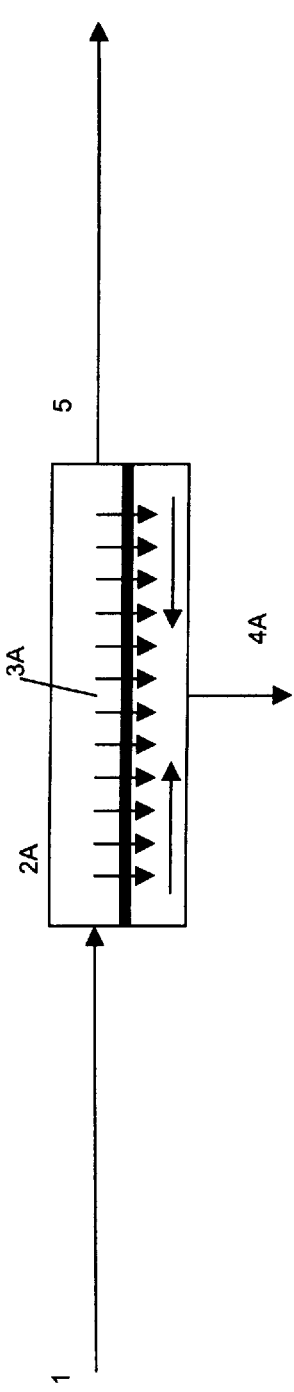
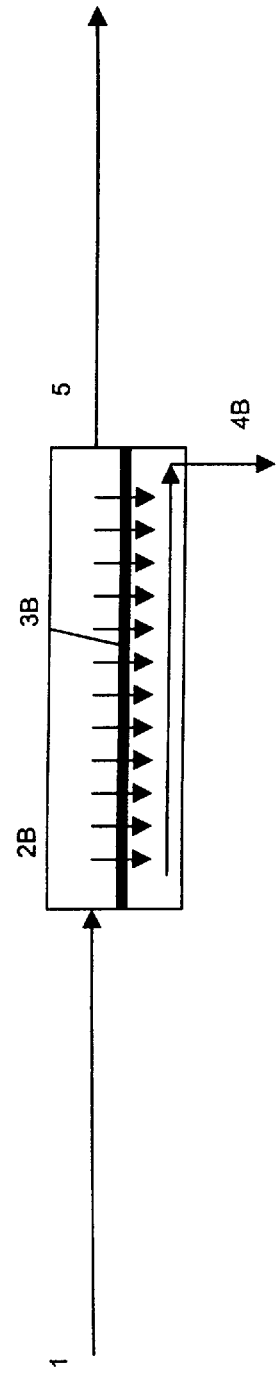
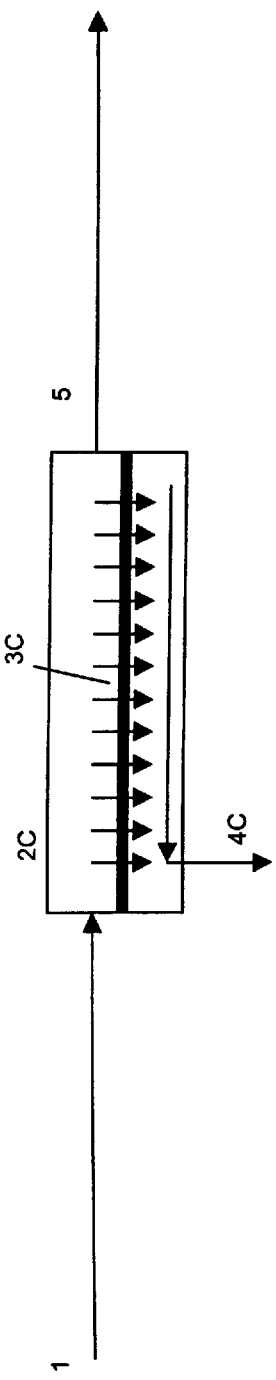

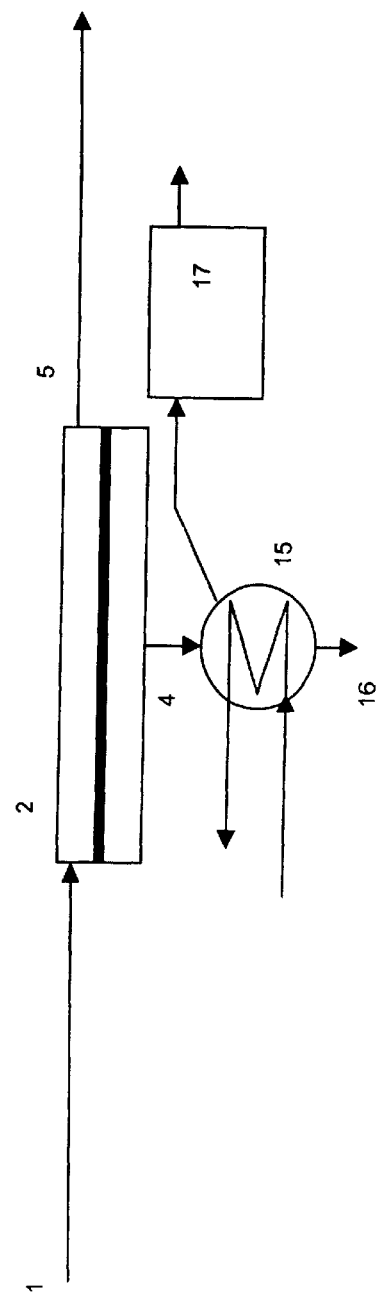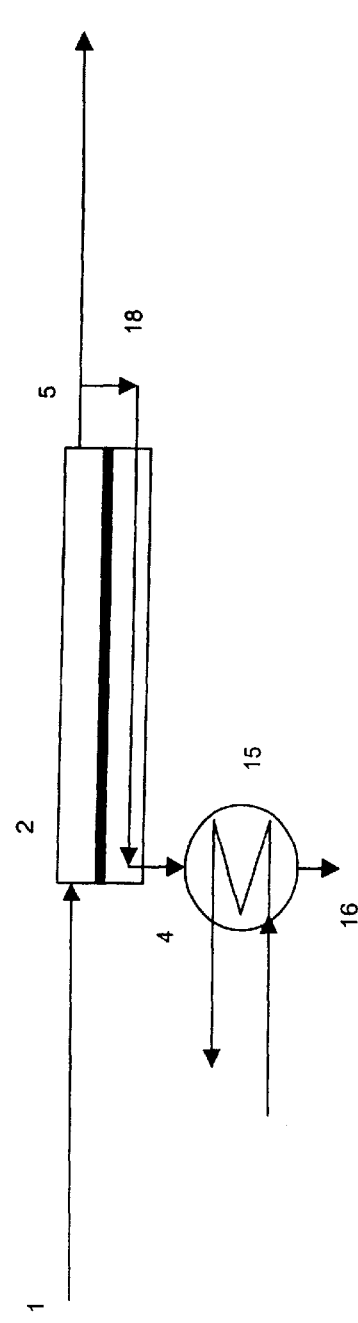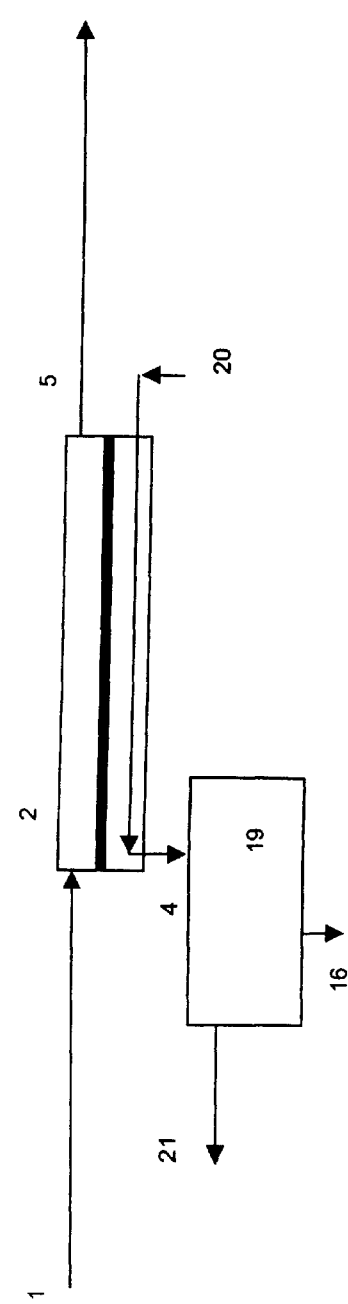
FIG. 3A
VACUUM
FIG. 3B
REFLUX
FIG. 3C
SWEEPING

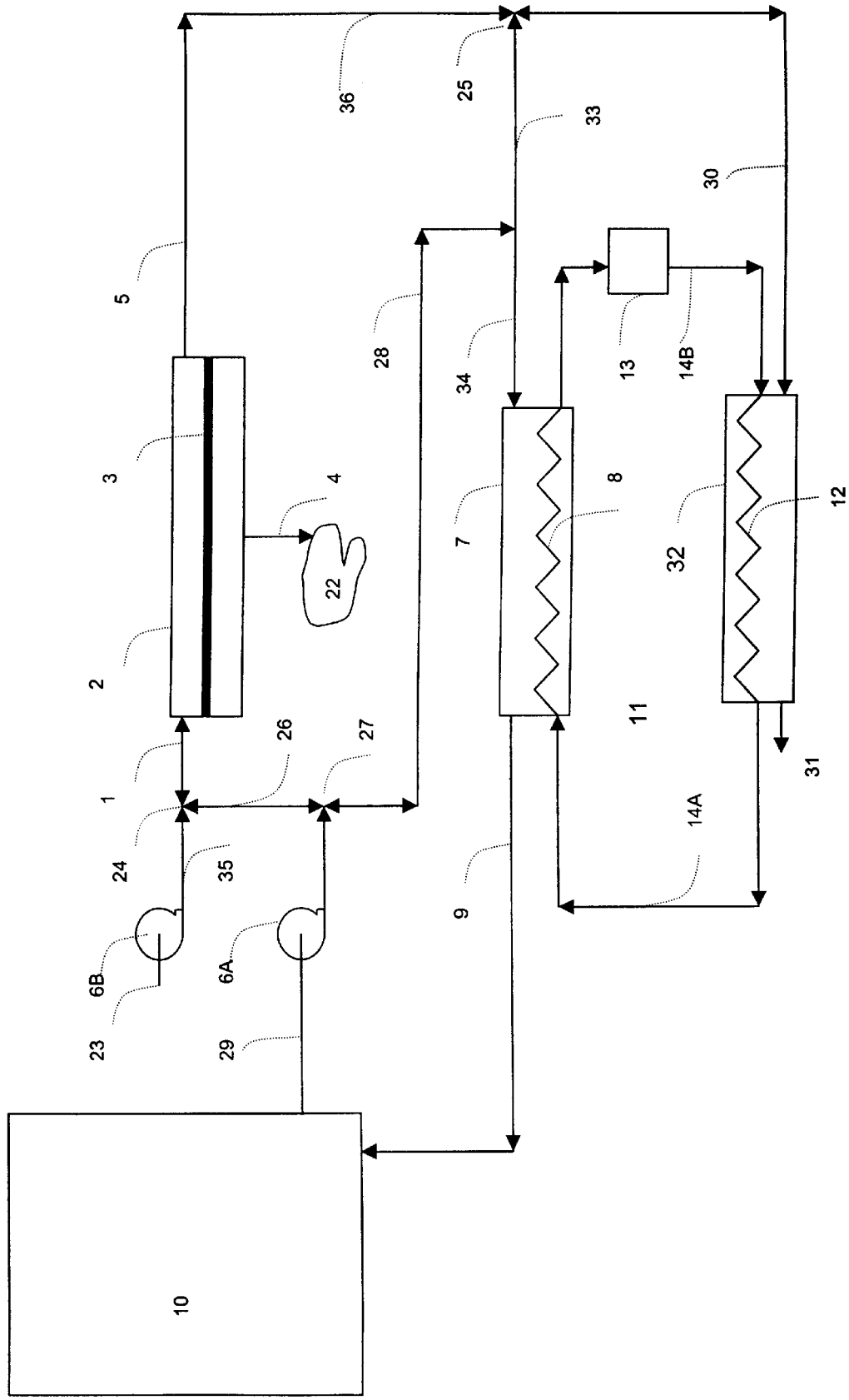
FIG. 4. DUAL MODE HYBRID HEAT PUMP

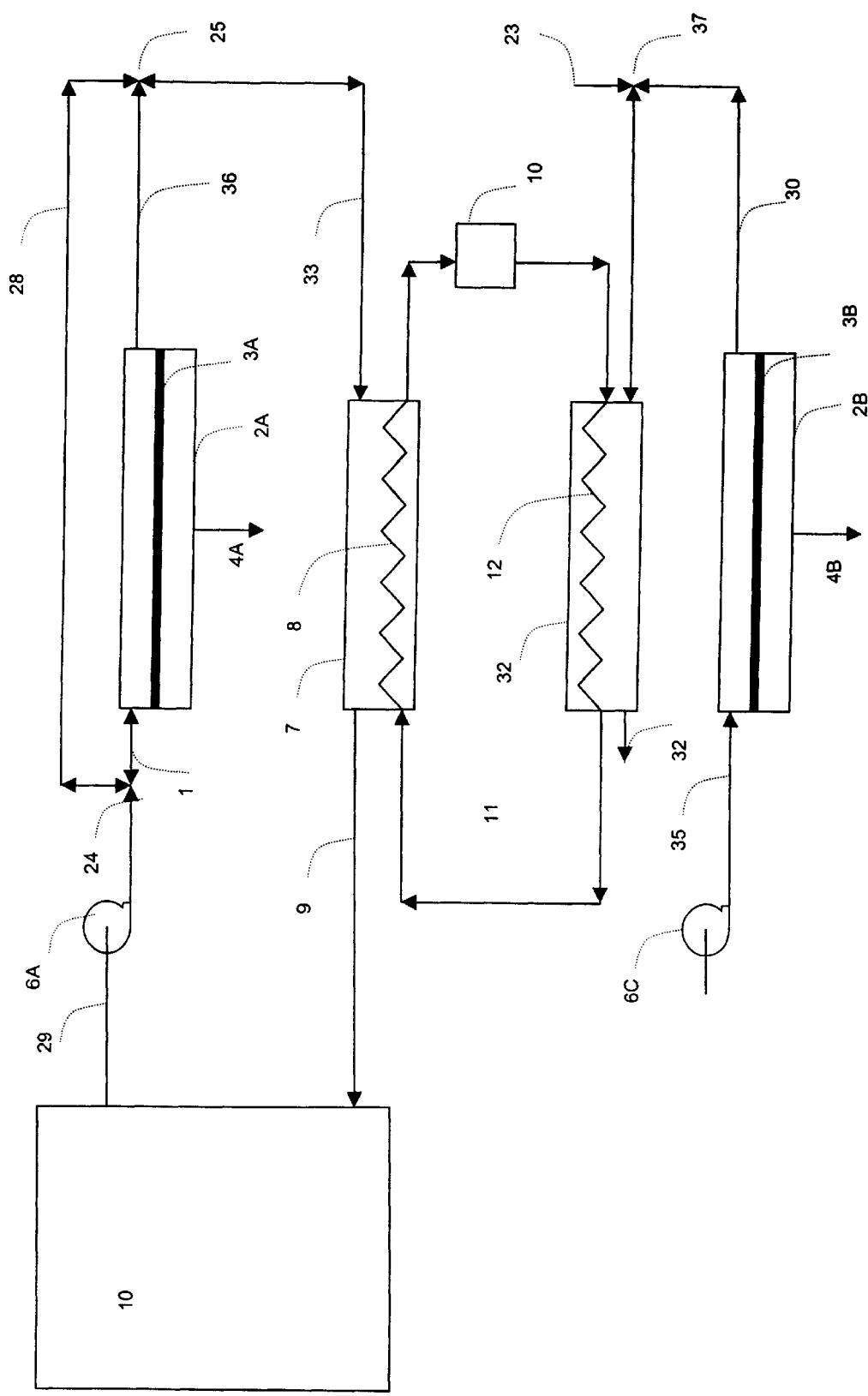
FIG. 5. DUAL MODE- TWO PERMEATORS HYBRID HEAT PUMP

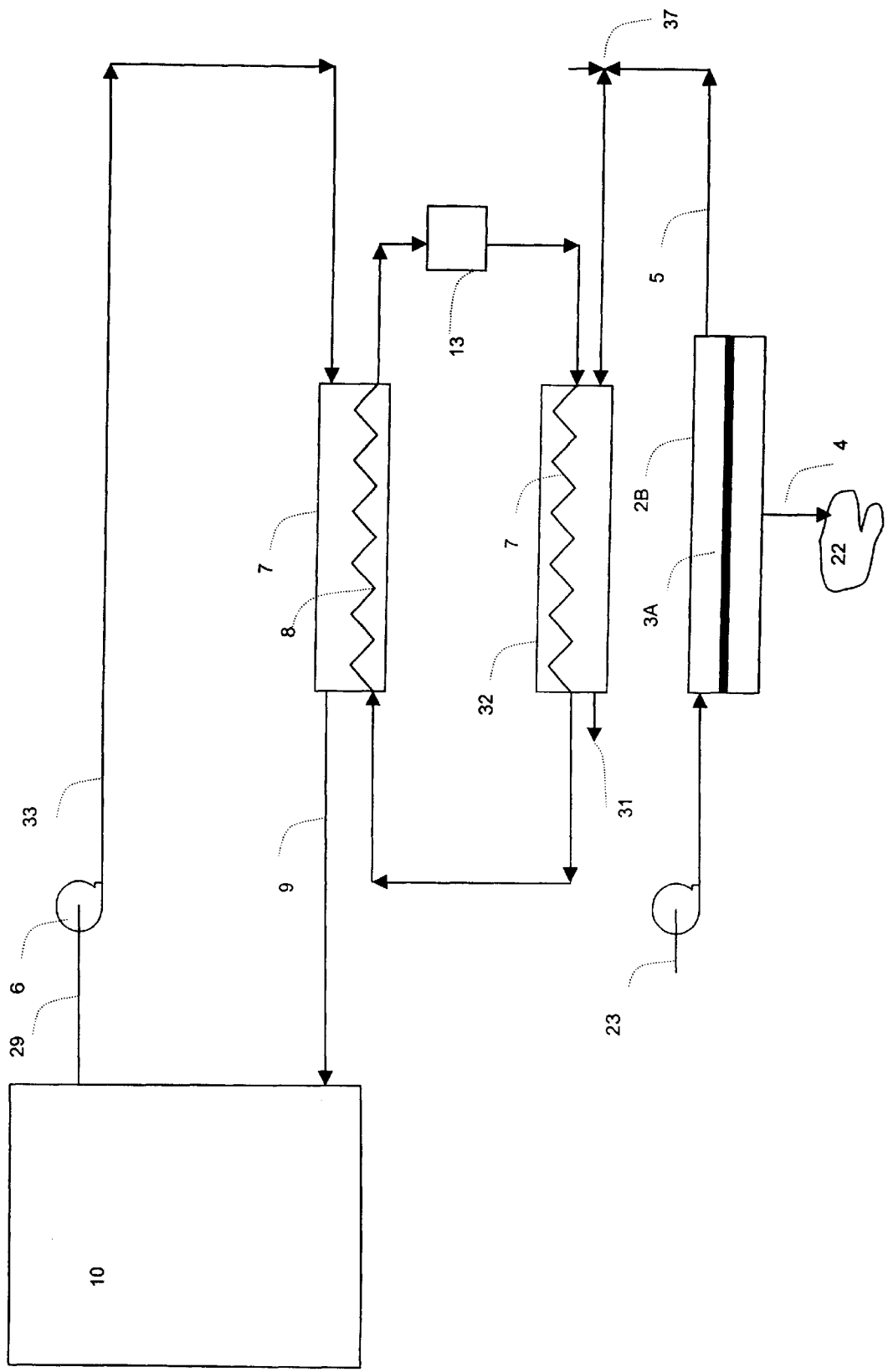
FIG. 6. HYBRID HEAT PUMP FOR REVERSE CYCLE

HYBRID HEAT PUMP

CROSS REFERENCE TO RELATED APPLICATIONS

The present application is claiming priority of U.S. Provisional Patent Application Ser. No. 60/251,207, which was filed on Dec. 4, 2000, and U.S. Provisional Patent Application Ser. No. 60/257,031, which was filed on Dec. 21, 2000.

BACKGROUND OF THE INVENTION

1. Field of the Invention

The present invention relates to a hybrid heat pump system and, more particularly, to a heat pump system that utilizes a combination of a conventional heat pump and a membrane permeator flow device for conditioning gas, preferably air, within an either enclosed or open space before the gas is treated by the heat pump.

2. Description of the Prior Art

Humidity has an effect upon a building. As humidity increases, so does the presence of bacteria, mold and mildew. Therefore, having an ability to control humidity and lower its level will contribute to an elimination of microorganism propagating environments. For example, refrigeration air conditioner systems in humid environments are often inadequate with respect to acceptable humidity control, with or without refrigeration incorporated therein. In wet or damp environments refrigeration air conditioner systems utilizing refrigerant cooled air coils are often overtaxed and their efficiency adversely affected. Humidity control becomes an important factor, not only as related to human comfort, health and structural deterioration, etc., but also as to adequacy of dehumidification and its efficient application.

A heat pump is a system that utilizes a thermodynamic process for taking thermal energy from a low temperature heat source and releasing it at higher temperature utilizing an input of energy from another source. A significant problem with heat pumps is that under certain circumstances an outdoor coil will, during a heating mode of operation, have frost accumulate thereon. Efficient operation of the system requires that sufficient heat be transferred from air flowing through an outdoor heat exchanger to maintain adequate capacity to meet a heating demand in a comfort zone. If the outdoor ambient air temperature is less than approximately 32° F., frost and ice may accumulate on the heat exchanger, blocking air flow therethrough to such an extent that its capacity for heat transfer is reduced below that required to meet the heating demand in the comfort zone. As the frost thickness increases, the overall efficiency of the system decreases dramatically, and energy is wasted. Accordingly, many schemes have heretofore been proposed for detecting the frost and for taking corrective action for removing the frost from the outdoor coil. Examples of prior art systems include U.S. Pat. Nos. 3,170,304, 3,170,305, 3,400,553, 4,373,349, 4,102,389, 4,209,994, 4,406,133 and 5,507,154.

Two significant factors that determine a rate of accumulation of frost on an outdoor coil during the system-heating mode are relative humidity and temperature of the outdoor air. Some prior art systems have attempted to solve the defrost problem by programming a fixed length of time of running a compressor before initiation of a defrost mode of operation based on an assumed value of outdoor air temperature. It has been a common practice to activate a reversing valve and remove heat from the system, "dumping" the heat into the outdoor coil to melt the ice. The equipment has usually been left in this defrost mode until the coil temperature reached 75° F. This causes a serious waste of energy. Also, the defrost action is frequently accomplished by reversing the main system to a "cooling" mode. This causes relatively hot refrigerant to be directed to the outdoor coil to melt the accumulated frost. However, this also causes cooling of the controlled building which is in turn typically offset by a use of high cost, lower-efficiency, electric resistance heating. Again, energy is wasted.

The accumulation of frost on evaporator coils of either a home or commercial refrigerator has been recognized as a problem for many years. To overcome the problem, defrost systems have been developed, some of which have been commercially successful. Examples of prior art systems include U.S. Pat. Nos. 3,084,520, 3,126,716, 3,499,295, 4,122,687, 5,406,805 and 5,867,994. Solutions suggested in these patents include additional heating, a dual evaporator or changes in air circulation.

The addition of heat to the system thus utilizes energy to melt ice on the coils and energy to cool the refrigerator to the extent of heat added by the heating coils. Thus, there is a substantial increase in energy requirements in the defrost step and in the subsequent cooling step, as a result of using heating for defrosting the evaporator coils.

Systems with two evaporator coils alternately cool the air passing therethrough. Such systems require complex valving for the refrigeration fluid and add some heat from the refrigeration fluid to the defrost coils.

In a system that change air circulation, a refrigeration unit has a defrost system that defrosts the evaporator coil by passing warmer air across the evaporator coil to heat the defrosting air. Although such a system offers an improvement, it still consumes additional energy.

Desiccation is a process of removing vapor of one or more liquids out of a gas containing the vapor, resulting in vapor depleted or dry gas. Usually this is done by adsorption material such as zeolites or silica gel. However it can be done by absorption, for example, absorption of water vapor by sulfuric acid.

To overcome the moisture problem in refrigeration, several inventors have suggested hybridization of a heat pump with a desiccation system. U.S. Pat. No. 4,941,324 describes a hybrid air conditioning system that simultaneously dehumidifies and cools air using standard vapor-compression equipment and aqueous solutions of liquid desiccant. U.S. Pat. Nos. 4,700,550, 5,517,828, 5,551,245 and 5,816,065 describe hybrid air pump systems that combine solid desiccation systems mostly in the form of a rotatable moisture transfer wheel with desiccant material, and a rotatable heat exchange wheel with heat pumps that include an evaporator, compressor, condenser and metering device operatively coupled by a refrigerant circulating line for evaporation of refrigerant and transfer of heat to the refrigerant.

Using desiccant systems for removing moister from the processed gas or air is subject to several limitations. The process of dehumidification with desiccant adds heat to a column of air being treated, it being desirable to remove this heat before it reaches the refrigeration cooling coil. The process of dehumidifying with desiccant requires the regeneration or strengthening of a weakened moisture laden desiccant. This process requires an application of heat to the desiccant material and requires either alternating desiccation regeneration cycles or use of a mechanically cumbersome desiccant wheel.

A membrane is a semi permeable barrier capable of selectively permeating certain constituents our of fluid mixture. A membrane permeator is a self contained assembly of membrane packaging, including all required housings and piping components, capable of rendering perm selective separation of a fluid mixture.

A membrane separation method for removing water vapor in gases is a method in which a gas containing water vapor is contacted to one side of a vapor permselective membrane assembly, and a dry gas is contacted to the other side of the membrane. The water vapor is selectively permeated and separated through the membrane. In principle, it has merits over other methods such that running cost is low, the structure of the apparatus is simple, and dry air can continuously be obtained without polluting the air.

As a vapor permselective membrane for permeability of water vapor, an ion exchange membrane as well as a dehumidifying method using such membrane have been proposed by U.S. Pat. Nos. 3,735,558 and 4,909,810. Hollow fiber membrane-based dehydration is also known. See, for example, U.S. Pat. Nos. 4,783,201, 4,725,359, 4,718,921, 4,497,640, 4,583,996 and 3,511,031. U.S. Pat. No. 4,900,626 discloses a hollow composite fiber for dehydration having a polydimethylsiloxane coating on a dense layer of the fiber support.

Although membranes have been used in various separation applications, their use for heat pump systems has been limited. U.S. Pat. Nos. 4,152,901 and 5,873,260 propose to improve an absorption heat pump by using of semipermeable membrane and pervaporation membrane respectively. U.S. Pat. No. 4,467,621 proposes to improve vacuum refrigeration by using sintered metal porous membrane, and U.S. Pat. No. 5,946,931 describes a cooling evaporative apparatus using a microporous PTFE membrane.

SUMMARY OF THE INVENTION

There is a need for a versatile multi-use dehumidifier unit adapted to pre-condition air in conjunction with a refrigeration air conditioning system. In such a dehumidifier unit, optimum humidity is attained in differing climatic conditions and operates efficiently either alone or in combination with the refrigeration air conditioning system.

It is an object of the present invention to provide a novel membrane desiccation heat pump system that is useful for various application such as cooling, chilling, heating and air conditioning, and that is low cost efficient and simple to maintain.

It is another object of the present invention to provide a hybrid heat pump system, which has an energy economy and an efficiency better than other kind of heat pumps. One important feature of the present invention resides in the fact it employs a process that is carried out without an addition of costly heat energy from an external source.

Another object of the present invention is to provide a hybrid heat pump for an air conditioning system, and for heating and cooling, that permits a greater degree of independent control of temperature and humidity for achieving parameter levels in desired regions of a comfort zone.

It is a further object of the present invention to provide a versatile dehumidification system adaptable to efficient operation in diverse climatic conditions, in combination with an air refrigeration system. A feature of such an air pre-conditioner unit when combined with an air-conditioned refrigeration system is increased efficiency of the refrigeration system.

It is still a further object of the present invention to provide a hybrid heat pump system capable of working in a reverse mode for heating operation with a frost free heat taking capability from a low temperature heat source under diverse temperature and moisture conditions.

Another object of the present invention is to provide a hybrid heat pump-based liquid chilling and heating reverse cycle chilling (RCC) process system usable for various applications.

Still another object of the present invention is to provide a frost-free refrigeration system operating at a low cost and high reliability, both for commercial and domestic applications.

These and other objects of the present invention are achieved by a hybrid heat pump system. The system includes (i) a membrane perneator having a permselective membrane capable of selectively removing vapor from a vapor-containing gas to yield a dry gas, (ii) a heat pump having (a) an internal side for exchanging thermal energy with a process fluid, (b) an external side for exchanging thermal energy with an external environment, and (c) a thermodynamic mechanism for pumping thermal energy between the internal side and the external side in either direction, (iii) means for conveying the vapor-containing gas into the membrane permeator, and (iv) means for routing the dry gas to either of the internal side or the external side.

The present invention also contemplates a method for treating vapor-containing gas. The method includes the steps of (i) selectively removing vapor from the gas, to yield a dry gas, using a membrane permeator having a vapor permselective membrane, (ii) bringing the dry gas in contact with either of (a) an external side of a heat pump, or (b) an internal side of the heat pump, wherein the internal side exchanges thermal energy with a process fluid, and wherein the external side exchanges thermal energy with an external environment; and (iii) employing a thermodynamic process to pump thermal energy between the internal side and the external side.

The present invention relates to a hybrid heat pump for use in association with a gaseous flow system adapted to move a gaseous process fluid such as air, containing moisture vapor. The hybrid system includes a heat pump of any type unit used for either cooling or heating, combined with a moisture vapor membrane permeator, and means for passing the process fluid through the membrane permeator to dry the process fluid and substantially reduce the moisture vapor in the process fluid, vapor removal means for removing the concentrated vapor from the membrane permeator, thereby separating the vapor from the gaseous process fluid circulating in the system. The use of the membrane perneator substantially reduces a condensable load from a heat taking side of the heat pump and prevents accumulation of the condensable load on the heat taking side. Further, because of the use of the membrane permeator combined with the heating unit and/or the cooling heat pump in the unit, the heat pump can achieve a better thermal efficiency and better reliability of operation.

A feature and advantage of the present invention is that the hybrid heat pump permits operation under conditions of temperature and moisture with out using extra energy to handle such conditions. Thus, the present invention provides a very efficient heat pump for the purpose of either cooling or heating.

A principle component of the present invention is its employment of a membrane separation process for removal of vapor from a stream of carrier gas. Removal of the vapor from the gas stream is also the removal of the latent heat contained in this vapor thus providing the thermodynamic vehicle for the heat pump.

A membrane suitable for the present invention must be capable of an efficient and economical separation of vapor from the carrier gas. Such a membrane separator assembly may come in different shapes and forms. The following paragraphs describe features of a membrane assembly suitable for use for vapor separation in the present invention.

The membrane assembly may include one or more membrane units that could be assembled in any array, such as series, parallel, cascade or a membrane column. A membrane unit may be either a self-contained module or a combination of one or more membrane elements in a housing. A membrane element can be in any form of packaging of membrane area in a single item such as, but not limited to, module, cartridge, plate, etc.

The membrane could be solid or liquid, organic or inorganic, pre-made or dynamic, charged or uncharged, ionic or non-ionic, hydrophilic or hydrophobic, porous or dense, permeable, non-permeable or semi permeable. It could be polymeric, metallic, ceramic, carbon or glass. Membrane geometry could be in any form such as flat sheet, tubular, capillaries, hollow fibers or a monolith. A membrane element could be in any configuration such as hollow fiber module, hollow fiber plates, spiral wound module, plate and frame, pleated or folded cartridge, envelopes, bags, tubes and sheets, spiral tubes, candles or monolithic.

Vapor permeates through a membrane from a feed side of the membrane to a permeate side of the membrane. A flow pattern of either a feed-retentate side or a permeate side of the membrane in the membrane unit may be counter-current, co-current or both. It could be transverse flow, diagonal flow or random direction flow. It could be unidirectional or multi directional. It could be one pass or multi pass. Either flow could be on any side of the membrane in the element configurations.

Removal of the permeating vapor from the membrane unit may be direct or may be facilitated by means such as reflux flow, either internal or external, vacuum and/or condensation. It could be a sweep stream that may be of gas or liquid. Such a sweep stream may be inert or reactive, i.e., having either physical or chemical affinity toward the permeating vapor.

A membrane for vapor separation from gas especially dehydration is preferably capable of removing water vapor from the feed gas to a desired dew-point, the water vapor separation takes place with as little loss of feed gas to the permeate as possible and the process economically perform this separation. In other words, the membrane surface area required to perform a given water vapor separation should be as small as possible.

A driving force for a transport of vapor through the membrane is a partial pressure differential of the vapor across the membrane. Therefore, a partial pressure of water vapor in a gas leaving as permeate from a membrane module cannot exceed a partial pressure of water vapor in a feed gas entering the membrane module. In most cases, the partial pressure of water in a gas at saturation is very low. Therefore, the partial pressure driving force for the vapor transport must be provided by one of three methods: (1) a sweep method, in which dry gas from an external source is swept proximate to the permeate side of the membrane; (2) a vacuum method, in which a vacuum is applied to the permeate side of the membrane; or (3) a dilution method, in which (a) the permeate is left at, for example, atmospheric pressure, but either a small percentage of the feed gas is allowed to permeate the membrane, diluting the water vapor content of the permeate, or (b) reflux of a part of the dry retentate into the permeate compartment. In all three cases, the driving force for the permeation of the vapor in the feed gas is provided by the vapor partial pressure difference between the feed and the permeate.

The hybrid heat pump can be constructed in several configurations. It may be either an open cycle or close cycle gas system, and it may be either an open cycle or close cycle liquid system. The system may be operated either in a cooling mode or in a heating mode. It may also determine both the temperature and the vapor content of the out put gas. Specifically, the hybrid heat pump may serve as a very efficient air condition system both for large sizes and small sizes, and it may be an excellent system for providing frost-free refrigeration for various applications.

As in any heat pump, the laws of thermodynamics govern the hybrid heat pump. It removes heat from a media at a low temperature and transfers it to a higher temperature by investing external energy into the process. However it performs its tasks more efficiently, owing to the reduced load of condensable vapor on the heat taking side of the heat pump.

Another major component of the membrane desiccation heat pump is the heat pump. The heat pump may be of a type from any of the following groups:

(a) a mechanical, e.g., compression refrigeration, heat pump such as a gas expansion cycle or a vapor compression cycle, single or multi-stage single or binary fluid cycles, scroll type, screw type, rotary type, swash plate type, Stirling type, Rankin cycle type, Brayton cycle type or Cascade refrigeration cycle;
(b) an absorption refrigeration heat pump, such as an intermittent cycle or continuous process;
(c) evaporative cooling refrigeration such as vacuum refrigeration or centrifugal compression system;
(d) a solid carbon dioxide process;
(e) a thermoelectric cooling element, e.g., an electronic heat pump; and
(f) a desiccant heat pump, a desiccant bed type, a desiccant wheel type or a liquid desiccant system.

Such a heat pump has an internal side that exchanges energy with the fluid to be processed, an external side, that exchanges energy with the outside ambient environment, and a thermodynamic mechanism to pump energy from one side to another in either direction.

The hybrid heat pump of the present invention works in either a cooling mode or a reverse heating mode. It can be utilized for air conditioning, chilling and heating, and commercial, domestic or industrial commercial and cryogenic applications. The hybrid heat pump serves as an excellent system for providing chilling or heating in reverse cycle chilling (RCC) for various applications.

BRIEF DESCRIPTION OF THE DRAWINGS

FIG. 1 is a diagram of a basic hybrid heat pump for air conditioning and refrigeration.

FIG. 2A is a diagram of mixed permeate flow mode in a membrane permeator.

FIG. 2B is a diagram of a co-current permeate flow mode in a membrane permeator.

FIG. 2C is a diagram of a counter-current permeate flow mode in a membrane permeator.

FIG. 3A is a diagram of a removal of permeate from a membrane permeator by vacuum.

FIG. 3B is a diagram of a removal of permeate from a membrane permeator by reflux.

FIG. 3C is a diagram of a removal of permeate from a membrane permeator by sweeping.

FIG. 4 is a diagram of a dual mode hybrid heat pump.

FIG. 5 is a diagram of a dual mode two-permeator hybrid heat pump.

FIG. 6 is a diagram of a hybrid heat pump for reverse cycle.

DESCRIPTION OF THE INVENTION

The following description makes reference to the annexed drawings. All drawings illustrate exemplary embodiments of the present invention. Auxiliary equipment and conveying means, such as pumps, valves, heat exchangers, condensers, compressors, blowers, piping; ductwork, fittings and dampers either are not shown or are shown partially.

As used herein, the term "fluid" means a substances with no reference configuration of permanent significance, aggregate of matter in which molecules are able to flow past each other with out fracture planes forming. Subdivisions of fluids are gases vapors and liquids. The phrase "gaseous fluid" means a fluid where its volume is a function of pressure and its absolute temperature. All gaseous fluids approximately obey the ideal gas equation $pv=nRT$ where p is pressure, v is volume, n is number of moles, R is the gas constant (0.082 liter atm/deg K) and T is absolute temperature.

FIG. 1 shows a hybrid heat pump according to the present invention. It is a basic hybrid heat pump for air conditioning or refrigeration. The principle components of the hybrid heat pump of FIG. 1 are a membrane permeator 2 having a vapor permselective membrane 3, and a heat pump 11. The function of heat pump 11 is to remove heat from a vapor-containing gas stream that is provided via a line 1 that comes from an end user 10.

In practice, line 1 can be provided from an enclosed space of end user 10. Such an enclosed space may be for example, an inner space of a building, a compartment of a refrigerator or an inner space of a refrigeration vehicle or a container. It may also be a chemical or industrial process.

The stream via line 1, which is pumped by an optional blower 6, may also come in whole or in part from an external source via a line 23. The external source can be an ambient atmosphere or any type of any gas pipeline.

The stream via line 1 enters membrane permeator 2, and permselective membrane 3 renders selective permeation of the vapor from line 1. Concentrated vapor 22 exits via port 4. Such a permeation process may be facilitated in any of the manners shown below in FIGS. 2A to 3C.

A vapor-depleted gas stream 5 flows into an enclosed casing 7 that contains an internal side 8 of heat pump 11. Internal side 8 is a heat-taking side. Examples of a heat-taking side are an evaporator of cycles such as either vapor compression or absorption types, a heat taking coil of a gas expansion cycle, a heat exchanger wheel of a desiccant heat pump, or a cold side of a thermoelectric cooling element. Internal side 8 cools vapor-depleted gas stream 5, and a chilled gas flows via a line 9 to end user 10. However, since a humidity level of vapor-depleted gas stream 5 is substantially reduced, either condensation or vapor is either eliminated or minimized on a cold surface of internal side 8 resulting in the following benefits:

(a) energy that otherwise would be wasted on condensation or freezing of vapor is saved;
(b) a heat transfer coefficient between vapor-depleted gas stream 5 and internal side 8 is kept high owing to a lack of frost or dew that would reduce it substantially;
(c) a lack of condensed moisture in an air conditioning system reduces bio-fouling and growth of microorganisms and mold in a duct system; and
(d) in a refrigeration system a requirement for defrosting is substantially reduced or eliminated, resulting in substantial saving in energy and cost owing to simplification of the system.

Heat pump 11 also includes a mechanism 13, such as a compressor and expansion valve in a mechanical refrigeration cycle, a generator in an absorption cycle, a flash evaporator in an evaporation cycle, a desiccation wheel in a desiccation cycle and a power supply in a thermoelectric cycle.

Another component of heat pump 11 is an external side 12, which is a heat-rejection side of heat pump 11. External side 12 disperses, in the form of thermal energy, a total energy of heat pump 11, i.e., thermal energy obtained at the internal side 8, which in a case of either a vapor compression cycle or an absorption cycle is represented by a refrigerant condenser, plus energy invested in the mechanism 13, to the environment.

Lines 14A and 14B convey refrigerant in most type of heat pumps. In thermoelectric heat pumps they convey electrons, i.e., electric current and in a solid desiccation heat pump the desiccant is conveyed by the rotation of a desiccant wheel from one side to another.

FIGS. 2A–2C show permeate flow within several alternate embodiments of membrane permeators suitable for use as membrane permeator 2.

FIG. 2A shows a membrane permeator 2A having a mixed permeate flow configuration. Permeate passes through a permselective layer of a permselective membrane 3A and then exits via a permeate exit 4A. All of a gas required to dilute a permeate stream comes from a feed gas. In mixed-flow, the gas, i.e., vapor and gas to be dried, on the permeate side of a given section of the membrane blends with the other gas that permeates other sections of the membrane in such a way that permeation through that section may be calculated according to the average permeate concentration. Such permeate flow typically occurs in spiral wound membrane module, transversal hollow fiber module and some plate and frame module.

FIG. 2B shows a membrane permeator 2B in which permeate flows in a co-current configuration. A permeate concentration is ever increasing as it flows down a permeate channel parallel to a feed side flow, through a permselective membrane 3B, and exits via a permeate exit 4B at a down stream end of membrane permeator 2B.

FIG. 2C shows a membrane permeator 2C in which permeate flows in a counter current configuration, which is usually more favorable than that of either the mixed or co-current configurations. As a more dilute permeate from a downstream side of membrane permeator 2C flows in a counter direction to a feed side flow, it cumulatively blends with permeate from preceding sections to lower their concentration and thereby increase a driving force across a permselective membrane 3C resulting in a higher permeate flux. The dilute permeate exits via permeate exit 4C, which is located at an upstream side of membrane permeator 2C.

FIGS. 3A–3C illustrate several techniques for facilitating higher permeate flow in a membrane permeator by lowering a vapor concentration on a permeate side of the membrane permeator.

FIG. 3A shows permeate removal by vacuum. This may be done either by a vacuum pumping means 17 that may be a vacuum pump or a steam injector. Having a condenser 15, of which a stream of condensate 16 exits, between permeator 2 and vacuum pumping means 17 reduces substantially the pump capacity requirements as vacuum pumping means 17 is used only to remove non-condensable gas. Energy consumption of vacuum pumping means 17 should be taken into account for calculating heat pump efficiency.

FIG. 3B shows a removal of permeate by counter current reflux. A partial stream 18 of dried gas, i.e., a reflux stream, is drawn from downstream of a retentate outlet and directed into a permeate channel. Energy investment here is in a form of compression energy invested in this reflux stream. A condenser 15 is used when the gas has to be recovered or when the condensation is to be used.

FIG. 3C shows dilution of a permeate stream by sweeping, using either a liquid or a gas sweep stream 20. An optional separator 19 may be a condenser, of which a stream of condensate 16 and a stream of liquid depleted sweeper 21 exits, if the sweep fluid is a gas. If the sweep stream is another liquid separator 19 may be any appropriate equipment capable of separating the two liquids such as by extraction crystallization or distillation.

FIG. 4 shows another embodiment of the present invention. The embodiment of FIG. 4 is a dual mode hybrid heat pump, i.e., a heating mode and a cooling mode. When a heat pump is employed in a heating mode it works in a reverse cycle, i.e., it pumps heat from a low-temperature environment and releases it to an end user. Thus internal side 8 and external side 12 switch functions as compared to that shown in FIG. 1. That is, in FIG. 4 external side 12 is a heat-taking side and internal side 8 is a heat rejection side.

Accumulation of ice on external side 12 is a major problem. This embodiment differs from the embodiment of FIG. 1 in that it enables a use of vapor-depleted gas stream 5 for dissipation of rejected heat from external side 12. Using tri-way valves 24, 25 and 27 enables switching of a routing of a dry gas, i.e., vapor-depleted gas stream 5, between modes.

In the cooling mode air is obtained from end user 10 via a line 29, blower 6A, line 26, and line 1 into membrane permeator 2. Dry gas, i.e., vapor-depleted gas stream 5, leaves permeator 2 via lines 36, 33 and 34, and enters enclosed casing 7. After chilling by internal side 8, a chilled gas goes to end user 10 via line 9.

In the reverse mode, i.e., heating mode, air from end user 10 goes via line 29, a blower 6A, lines 28 and 34 into casing 7. After being heated by internal side 8, which now acts as a heat rejection side for vapor-depleted gas stream 5, the air goes back to end user 10 via line 9. Ambient air enters line 23, to a blower 6B, to lines 35 and 1 into membrane permeator 2. Dry air from permeator 2 passes via lines 36 an 30 into a casing 32. Dry air, i.e., vapor-depleted gas stream 5, transfers heat to external side 12. Cold dry air is vented to the atmosphere via a line 31. Since external side 12 takes thermal energy from vapor-depleted gas stream 5 and not directly from ambient air, frosting of moisture on external side 12 is prevented, resulting in the following advantages:
(a) energy that otherwise would be wasted on condensation or freezing of vapor is saved;
(b) a heat transfer coefficient between vapor-depleted gas stream 5 and internal side 8 is kept high owing to lack of frost or dew that would reduce it substantially;
(c) lack of condensed moisture in an air conditioning. system reduces bio-fouling and growth of microorganisms and mold around external side 12; and
(d) a requirement for defrosting is substantially reduced or eliminated, resulting in substantial saving in energy and cost owing to simplification of the system.

FIG. 5 shows an embodiment of this invention as a dual mode two-permeator hybrid heat pump. The functions of this embodiment are similar to that of FIG. 4, however the embodiment in FIG. 5 uses two membrane permeators 2A and 2B, and a blower 6C for reverse heating mode of heat pump 11 to dry the air used for supplying thermal energy to external side 12.

Membrane permeator 2A is idle in the reverse heating mode and is circumvented by tri-way valves 24 and 25 and bypass line 28. In cooling mode permeator 2A is employed while permeator 2B is idle and tri-way valve 37 channels free ambient air flow from line 23 into casing 32 for dissipating the rejected heat from external side 12.

FIG. 6 shows another embodiment of a hybrid heat pump for a reverse cycle. This embodiment lends itself not only to gas heating and cooling but also to liquid heating and chilling. Fluid circulating in a loop of lines 29,33 and 9 may be either gas or liquid. This embodiment substantially increases efficiency of a reverse cycle chiller (RCC). Membrane permeator 2B is idle in a cooling mode. In a reverse heating mode permeator 2B provides dry air for the external side 12 thereby rendering all the benefits mentioned above for such mode of operation.

It should be understood that various alternatives and modifications of the present invention could be devised by those skilled in the art. The present invention is intended to embrace all such alternatives, modifications and variances that fall within the scope of the appended claims.

What is claimed is:

1. A hybrid heat pump system comprising:
   a membrane permeator having a permselective membrane capable of selectively removing vapor from a vapor-containing gas to yield a dry gas;
   a heat pump having (a) an internal side for exchanging thermal energy with a process fluid, (b) an external side for exchanging thermal energy with an external environment, and (c) a thermodynamic mechanism for pumping thermal energy between said internal side and said external side in either direction;
   means for conveying said vapor-containing gas into said membrane permeator; and
   means for routing said dry gas to either of said internal side or said external side.

2. The hybrid heat pump system of claim 1, wherein said heat pump is selected from the group consisting of (a) a mechanical heat pump, (b) an absorption refrigeration heat pump, (c) an evaporative cooling refrigeration heat pump, (d) a solid carbon dioxide process heat pump, (e) an electronic heat pump, and (f) a desiccant heat pump.

3. The hybrid heat pump system of claim 1, wherein said permselective membrane is a type selected from the group consisting of solid, liquid, organic, inorganic, pre-made; dynamic, charged, uncharged, ionic, non-ionic, hydrophilic, hydrophobic, porous, dense, permeable, non-permeable, semi permeable, polymeric, metallic, ceramic, carbon and glass.

4. The hybrid heat pump system of claim 1, wherein said permselective membrane comprises a geometry selected from the group consisting of a sheet, a tube, a capillary, a hollow fiber, a monolith, a hollow fiber module, a hollow fiber plate, a spiral wound module, a plate, a frame, a pleated cartridge, a folded cartridge, an envelope, a bag, a spiral tube, and a candle.

5. The hybrid heat pump system of claim 1, wherein said permselective membrane comprises a configuration selected from the group consisting of one membrane unit, multi membrane units, parallel array, cascade array, column array, self contained module, and a membrane element in a housing.

6. The hybrid heat pump system of claim 1, wherein said membrane permeator is characterized by a permeate flow mode selected from the group consisting of mixed flow, co-current flow and counter-current flow.

7. The hybrid heat pump system of claim 1, wherein said heat pump facilitates a permeate flow within said membrane permeator by a technique selected from the group consisting of vacuum, reflux, gas sweeping, and liquid sweeping.

8. The hybrid heat pump system of claim 1, further comprising means for vapor condensation that facilitates a permeate flow within said membrane permeator.

9. The hybrid heat pump system of claim 1, wherein said heat pump operates in a mode selected from the group consisting of cooling and heating.

10. The hybrid heat pump system of claim 1, wherein said routing means selectively directs said dry gas to either of said external side or said internal side.

11. The hybrid heat pump system of claim 10, wherein said routing means comprises a tri way valve.

12. The hybrid heat pump system of claim 1, wherein said process fluid comprises a state selected from the group consisting of liquid and gas.

13. The hybrid heat pump system of claim 1,
wherein said membrane permeator is a first membrane permeator having an output routed to one of said internal side and said external side, and
wherein said hybrid heat pump system further comprises a second membrane perneator having an output routed to the other of said internal side and said external side.

14. The hybrid heat pump system of claim 1, wherein said membrane permeator has an output routed to said external side.

15. The hybrid heat pump system of claim 1, wherein said membrane premeator has an output routed to said internal side.

16. The hybrid heat pump system of claim 1, wherein said heat pump is a part of an air conditioning system.

17. The hybrid heat pump system of claim 1, wherein said heat pump is a part of a refrigerator.

18. The hybrid heat pump system of claim 1, wherein said heat pump is a part of a liquid chiller.

19. The hybrid heat pump system of claim 1, wherein said system is used for dehumidifying a gas.

20. The hybrid heat pump system of claim 1, wherein said hybrid heat pump system enables frost-free operation of a refrigerator.

21. The hybrid heat pump system of claim 1,
wherein said external side comprises an outside coil, and
wherein said hybrid heat pump system enables prevention of accumulation of ice on said outside coil.

22. A system for air conditioning comprising:
a membrane permeator having a permselective membrane capable of selectively removing water vapor from water vapor-containing air to yield dry air;
a heat pump having (a) an internal side for exchanging thermal energy with air, (b) an external side for exchanging thermal energy with an external environment, and (c) a thermodynamic mechanism for pumping thermal energy from said internal side to said external side;
means for conveying said water vapor-containing air into said membrane permeator; and
means for routing said dry air to said internal side.

23. A system for air conditioning comprising:
a membrane permeator having a permselective membrane capable of selectively removing water vapor from water vapor-containing air to yield dry air;
a heat pump having (a) an internal side for exchanging thermal energy with air, (b) an external side for exchanging thermal energy with an external environment, and (c) a thermodynamic mechanism capable of pumping thermal energy between said internal side and said external side in either direction;
means for conveying water vapor-containing air into said membrane permeator; and
means for selectively routing said dry air to either of said internal side or said external side.

24. A system for reverse cycle heating comprising:
a membrane permeator having a permselective membrane capable of selectively removing water vapor from water vapor-containing air to yield dry air;
a heat pump having (a) an internal side for exchanging thermal energy with air, (b) an external side for exchanging thermal energy with an external environment, and (c) a thermodynamic mechanism for pumping thermal energy from said external side to said internal side;
means for conveying water vapor-containing air into said membrane permeator; and
means for routing said dry air to said external side.

25. A system for frost free refrigeration comprising:
a membrane permeator having a permselective membrane capable of selectively removing water vapor from water vapor-containing air to yield dry air;
a heat pump having (a) an internal side for exchanging thermal energy with air, (b) an external side for exchanging thermal energy with an external environment, and (c) a thermodynamic mechanism capable of pumping thermal energy from said internal side to said external side;
means for conveying water vapor-containing air into said membrane permeator;
means for routing said dry air to said internal side, thus minimizing a formation of frost on said internal side.

26. A method for treating vapor containing gas, comprising:
selectively removing vapor from said gas, to yield a dry gas, using a membrane permeator having a vapor permselective membrane;
bringing said dry gas in contact with either of (a) an external side of a heat pump, or (b) an internal side of said heat pump, wherein said internal side exchanges thermal energy with a process fluid, and wherein said external side exchanges thermal energy with an external environment; and
employing a thermodynamic process to pump thermal energy between said internal side and said external side.

* * * * *